United States Patent
Conley et al.

(10) Patent No.: US 8,978,825 B2
(45) Date of Patent: Mar. 17, 2015

(54) DUAL-LINE PUMP UNIT, LUBRICATION SYSTEM, AND RELATED APPARATUS AND METHOD

(75) Inventors: Paul G. Conley, St. Charles, MO (US); Rainer Bels, Belrose (AU); Brad Allen Edler, Waterloo, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 506 days.

(21) Appl. No.: 13/451,213

(22) Filed: Apr. 19, 2012

(65) Prior Publication Data
US 2013/0277147 A1    Oct. 24, 2013

(51) Int. Cl.
*F16N 7/40* (2006.01)
*F16N 29/00* (2006.01)
*F16N 7/38* (2006.01)
*F16N 13/02* (2006.01)

(52) U.S. Cl.
CPC ............... *F16N 7/385* (2013.01); *F16N 13/02* (2013.01); *F16N 2260/50* (2013.01)
USPC .......................................................... 184/6

(58) Field of Classification Search
USPC ..................................... 184/6; 137/563, 565.3
See application file for complete search history.

(56) References Cited

U.S. PATENT DOCUMENTS

| | | | |
|---|---|---|---|
| 2,627,320 A * | 2/1953 | Rotter | 184/7.4 |
| 2,867,481 A | 1/1959 | Hornbostel | |
| 3,025,559 A | 3/1962 | Basinger | |
| 3,507,359 A | 4/1970 | Warnock | |
| 3,722,967 A | 3/1973 | Lewis | |
| 3,951,480 A | 4/1976 | Nicholson | |
| 3,958,725 A | 5/1976 | Reeve | |
| 4,069,835 A | 1/1978 | Stadler | |
| 4,718,824 A | 1/1988 | Cholet et al. | |
| 4,759,427 A | 7/1988 | Onose | |
| 5,022,556 A | 6/1991 | Dency et al. | |

(Continued)

FOREIGN PATENT DOCUMENTS

| | | |
|---|---|---|
| DE | 9412699 U1 | 12/1995 |
| DE | 19623537 A1 | 12/1997 |

(Continued)

OTHER PUBLICATIONS

International Search Report for related Application No. PCT/US2013/037072 dated Jul. 25, 2013, 4 pages.

(Continued)

*Primary Examiner* — William E Dondero
*Assistant Examiner* — Mark K Buse
(74) *Attorney, Agent, or Firm* — Senniger Powers LLP

(57) ABSTRACT

A dual-line pump unit for supplying lubricant includes a reservoir having an interior for holding lubricant. A first pump is provided for pumping lubricant from the reservoir through a first main line to a lubricant distribution system. A second pump is provided for pumping lubricant from the reservoir through a second main line to the lubricant distribution system. During a first stage of operation, the first pump operates to pump lubricant from the reservoir through the first main line to the lubricant distribution system and the second pump is idle, the second main line venting back to the reservoir via the second pump. During a second stage of operation, the second pump operates to pump lubricant from the reservoir through the second main line to the lubricant distribution system and the first pump is idle, the first main line venting back to the reservoir via the first pump.

17 Claims, 11 Drawing Sheets

(56) References Cited

U.S. PATENT DOCUMENTS

| | | | |
|---|---|---|---|
| 5,038,892 A | 8/1991 | Maloney | |
| 5,126,722 A | 6/1992 | Kamis | |
| 5,293,959 A | 3/1994 | Kimberlin | |
| 5,626,467 A | 5/1997 | Cantley | |
| 6,161,723 A * | 12/2000 | Cline et al. | 222/1 |
| 6,244,387 B1 | 6/2001 | Paluncic et al. | |
| 6,322,336 B1 | 11/2001 | Huss | |
| 6,705,432 B2 | 3/2004 | Conley et al. | |
| 6,793,042 B2 | 9/2004 | Brouillet | |
| 7,975,805 B2 * | 7/2011 | Wech | 184/6.22 |
| 8,783,418 B2 * | 7/2014 | Orlitzky et al. | 184/37 |
| 2002/0144865 A1 | 10/2002 | Clancy et al. | |
| 2002/0157901 A1 | 10/2002 | Kast et al. | |
| 2003/0039561 A1 | 2/2003 | Batten et al. | |
| 2005/0180870 A1 * | 8/2005 | Stanley et al. | 417/440 |
| 2006/0231341 A1 * | 10/2006 | Wech | 184/6.22 |
| 2007/0177835 A1 * | 8/2007 | Verhaegen | 384/462 |
| 2008/0240944 A1 | 10/2008 | Arens | |
| 2012/0134847 A1 * | 5/2012 | Conley et al. | 417/15 |

FOREIGN PATENT DOCUMENTS

| | | |
|---|---|---|
| GB | 2205905 A | 12/1988 |
| JP | 02080815 | 3/1990 |
| JP | 02195020 | 8/1990 |

OTHER PUBLICATIONS

Written Opinion for related International Application No. PCT/US2013/037072 dated Jul. 25, 2013, 5 pages.

International Search Report regarding corresponding PCT/US2013/030464, dated Sep. 27, 2013, 4 pages.

Written Opinion of the International Searching Authority, PCT/2013/030464, dated Sep. 27, 2013, 7 pages.

* cited by examiner

DUAL-LINE PUMP UNIT, LUBRICATION SYSTEM, AND RELATED APPARATUS AND METHOD

FIELD OF THE INVENTION

The present invention generally relates to apparatus for supplying lubricant, and more particularly to a dual-line lubrication system for pumping lubricant to a plurality of lubrication sites.

BACKGROUND OF THE INVENTION

This invention has particular application to automatic lubrication systems for supplying lubricant to multiple points of lubrication at predetermined intervals and/or in predetermined amounts. Lincoln Industrial sells such automated systems under the Quicklub®, Centro-Matic® and Helios® trademarks. The Quicklub® system includes a reservoir for holding a supply of lubricant, a stirrer for stirring the lubricant, and an electric or pneumatic pump for pumping lubricant from the reservoir to one or more progressive metering (divider) valves each of which operates to dispense lubricant to multiple points of lubrication. Reference may be made to U.S. Pat. No. 6,244,387, incorporated herein by reference, for further details regarding an exemplary Quicklub® system. The Centro-Matic® system is similar to a Quicklub® system except that lubricant from the pump is delivered through a single supply line to injectors each operating to dispense a metered amount of lubricant to a single lubrication point. Reference may be made to U.S. Pat. No. 6,705,432, incorporated herein by reference, for further details regarding an exemplary Centro-Matic® system. The Helios® system is a dual line system.

Although these systems have been proven to be reliable and commercially successful, there is a need for an improved pump unit that can be used with a wide variety of lubricant distribution systems and which is of simplified design.

SUMMARY OF THE INVENTION

In one aspect the present invention is directed to a dual-line pump unit for supplying lubricant. The dual-line pump unit includes a reservoir having an interior for holding lubricant. The dual-line pump unit also includes a first pump for pumping lubricant from the reservoir through a first main line to a lubricant distribution system and a second pump for pumping lubricant from the reservoir through a second main line to the lubricant distribution system. Each of the pumps includes a cylinder bore and a cylinder inlet in communication with the interior of the reservoir for flow of lubricant from the reservoir into the cylinder bore. Each pump further includes a cylinder outlet and a piston movable in the cylinder bore. Each pump also includes a vent passage communicating with the interior of the reservoir. Each pump further includes a linear position drive mechanism for moving the piston in a forward direction in the cylinder bore through a pumping stroke for pumping lubricant through the cylinder outlet to a respective main line for supply of lubricant to the lubricant distribution system, in a rearward direction through a non-venting return stroke in which the vent passage does not communicate with the interior of the reservoir, and in a rearward direction through a venting return stroke in which the vent passage communicates with the interior of the reservoir. The dual-line pump unit further includes a controller for controlling operation of the linear position drive mechanism. The controller operates the drive mechanism in a first stage of operation to move the piston of the first pump through at least one pumping stroke to pump lubricant through the first main line to the lubrication distribution system while the second main line vents back to the reservoir via the vent passage of the second pump. The controller further operates the drive mechanism in a second stage of operation to move the piston of the second pump through at least one pumping stroke to pump lubricant through the second main line to the lubrication distribution system while the first main line vents back to the reservoir via the vent passage of the first pump.

In another aspect, the present invention includes a dual-line lubrication system. The dual-line lubrication system includes a reservoir having an interior for holding lubricant. The dual-line lubrication system further includes a first pump in communication with the interior of the reservoir for pumping lubricant from the reservoir through a first main line. The dual-line lubrication system also includes a second pump in communication with the interior of the reservoir for pumping lubricant from the reservoir through a second main line. The dual-line lubrication system further includes a dual-line metering valve having a first valve inlet in communication with the first main line and the first pump and a second valve inlet in communication with the second main line and the second pump. During a first stage of operation the first pump operates to pump lubricant from the reservoir through the first main line to the first valve inlet of the dual-line metering valve and the second pump is idle, the dual-line metering valve venting back to the reservoir via the second main line and the second pump. During a second stage of operation the second pump operates to pump lubricant from the reservoir through the second main line to the second valve inlet of the dual-line metering valve and the first pump is idle, the dual-line metering valve venting back to the reservoir via the first main line and the first pump.

In another aspect, the present invention includes a method of supplying lubricant to a dual-line lubrication system. The method includes operating in a first stage of operation a first pump through a pumping stroke to pump lubricant from a reservoir through a first main line to a dual-line metering valve while venting the dual-line metering valve to the reservoir through a second pump. The method further includes operating in a second stage of operation the second pump through a pumping stroke to pump lubricant from the reservoir through a second main line to the dual-line metering valve while venting the dual-line metering valve to the reservoir through the first pump.

In yet another aspect, the present invention includes an apparatus for supplying lubricant. The apparatus includes a reservoir having an interior for holding lubricant. The apparatus further includes a first pump in communication with the interior of the reservoir for pumping lubricant from the reservoir to a lubricant distribution system. The apparatus also includes a second pump in communication with the reservoir of the reservoir for pumping lubricant from the reservoir to the lubricant distribution system.

The above summary is provided to introduce a selection of concepts in simplified form that are further described below in the Detailed Description. The summary is not intended to identify key features or essential features of the claimed subject matter, nor is it intended to be used as an aid in determining the scope of the claimed subject matter. Other objects and features will be in part apparent and in part pointed out hereinafter.

BRIEF DESCRIPTION OF THE DRAWINGS

Corresponding parts are indicated by corresponding reference numbers throughout the drawings.

DETAILED DESCRIPTION

Figure 1:
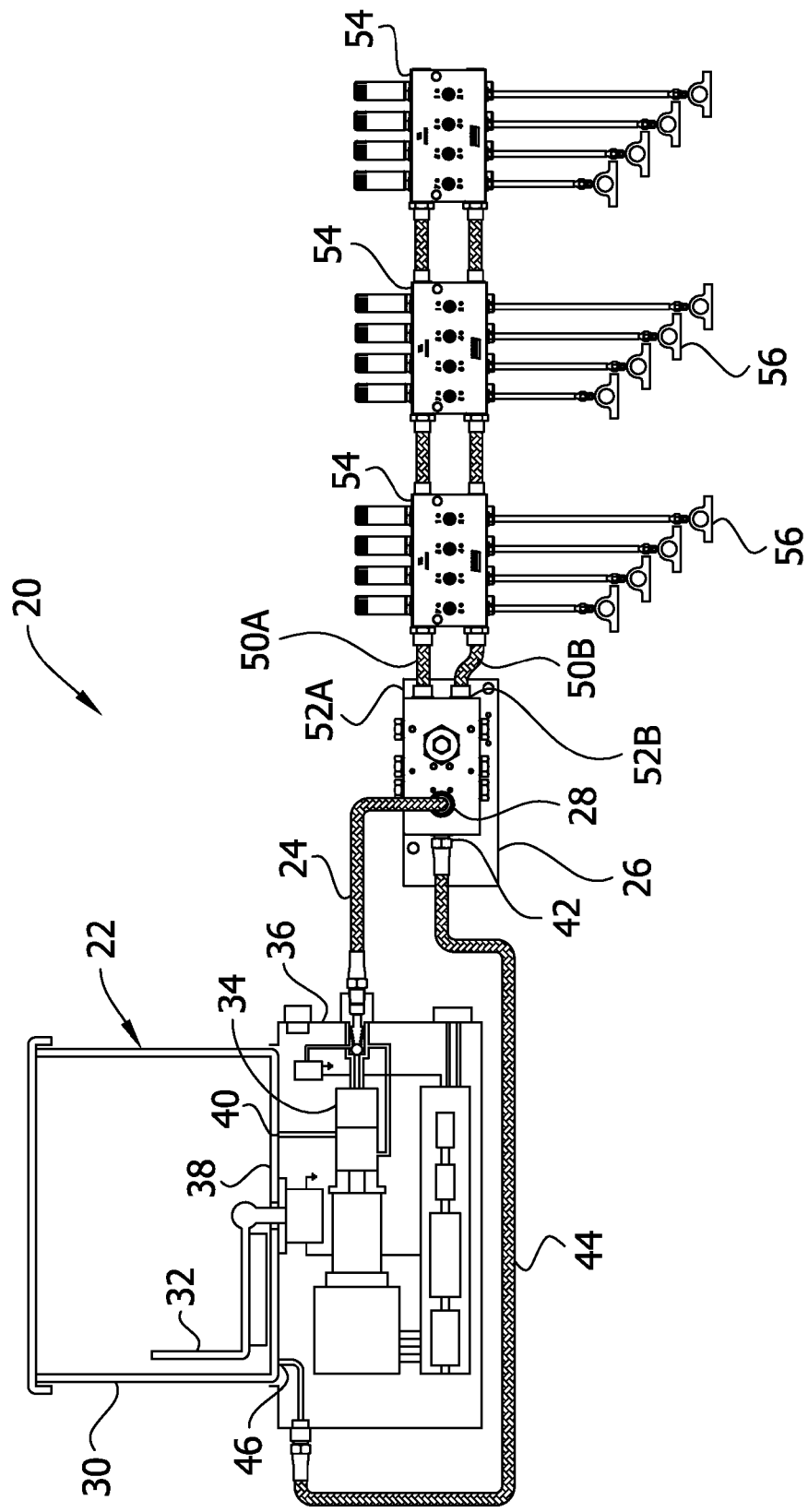
FIG. 1 is a diagrammatic view of a conventional dual-line lubrication system including dual-line metering valves for directing lubricant to points of lubrication.

FIG. 1 illustrates a conventional dual-line lubrication system, generally designated 20, comprising a pump unit, generally designated 22, that operates to pump lubricant through a lube supply line 24 to a four-way reversing valve 26 having a pressure inlet 28. The pump unit 22 includes a reservoir 30 for holding a lubricant (e.g., grease), a stirrer 32 for stirring the lubricant in the reservoir, and a pump 34 in a pump housing 36 below the reservoir. The reservoir 30 includes a bottom wall 38 and an outlet 40 in the bottom wall for discharging lubricant from the reservoir. The reversing valve 26 includes a relief port 42 connected to a return line 44 extending to a return port 46 on the pump unit 22 in fluid communication with the reservoir 30. Two main lubrication lines, 50A and 50B, are connected to respective ports, 52A and 52B, of the reversing valve 26. The main lubrication lines 50A, 50B deliver lubricant to dual-line metering valves 54 that deliver metered amounts of lubricant to points of lubrication 56 (e.g., bearings).

The reversing valve 26 of the conventional dual-line lubrication system 20 illustrated in FIG. 1 may be set in either of two positions. In a first position, lubricant is dispensed under pressure to the first lubrication line 50A and the second lubrication line 50B is connected to the reservoir 30 via the return line 44. When the pressure in the first lubrication line 50A reaches a preselected pressure, the valve 26 moves to a second position in which it directs lubricant through the second lubrication line 50B and connects the first lubrication line 50A to the reservoir 30 so pressure in the first line is relieved. When the valve 26 is in the second position, lubricant is dispensed under pressure to the second lubrication line 50B and the first lubrication line 50A is connected to the reservoir 30 via the return line 44. This conventional dual-line system uses one pump 34 connected to a reversing valve 26 by two lines 24, 44.

FIGS. 2-9 illustrate apparatus according to one embodiment of the present invention. The apparatus comprises a pump unit, generally designated 100, for supplying lubricant to different types of lubricant distribution systems (e.g., progressive systems, injector systems, CAN bus systems, dual line systems and combinations thereof). Examples of such systems may be found in U.S. patent application Ser. No. 13/271,814, assigned to Lincoln Industrial Corporation, which is incorporated by reference. In general, the pump unit 100 comprises a reservoir, generally designated 104, for holding a supply of lubricant (e.g., grease) and a pump housing 106 below the reservoir for housing various pump components of the unit, as will be described.

Figure 2:
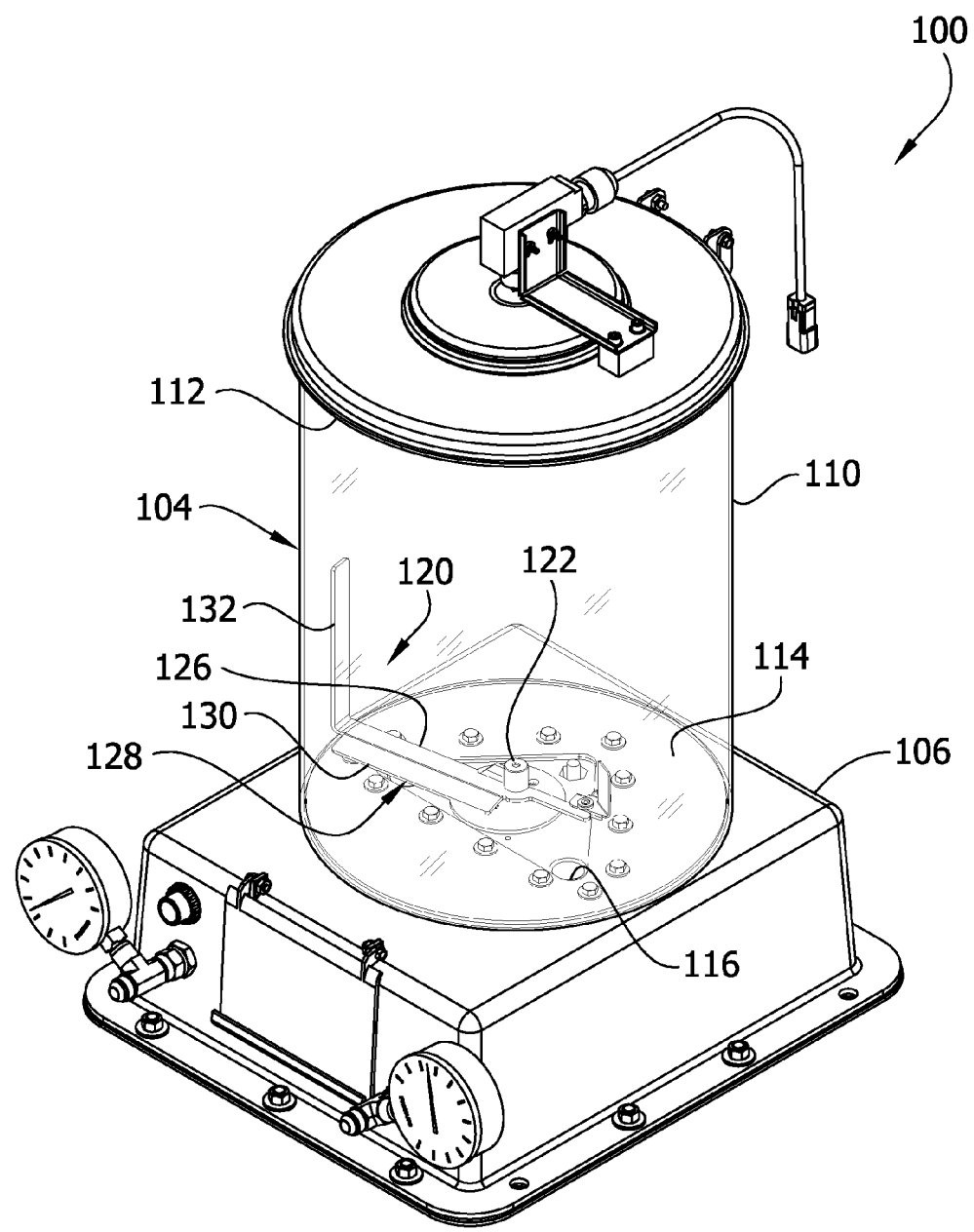
FIG. 2 is a perspective of a first embodiment of a pump unit of this invention.

In the embodiment of FIG. 2, the reservoir 104 comprises a cylindrical side wall 110, an open top 112 for loading lubricant into the reservoir, a bottom wall 114, and first and second outlets 116, 116' in the bottom wall for discharging lubricant from the reservoir. In operation, it is envisioned the open top 112 may be covered by a removable or fixed lid. A stirrer, generally designated 120, is provided for stirring lubricant in the reservoir 104. The stirrer 120 comprises a rotary hub 122 driven to rotate about a vertical axis by a stirrer drive mechanism 124 (FIG. 3) in the pump housing 106, an arm 126 extending laterally outward from the hub across the bottom wall 114, and a wiper, generally designated 128, on the arm. The wiper 128 has a lower blade portion 130 angling down toward the bottom wall 114 and an upper portion 132 extending up alongside the side wall 110 of the reservoir 104. Rotation of the stirrer 120 fluidizes lubricant in the reservoir 104. The lower blade portion 130 of the wiper 128 also forces lubricant down through the outlets 116, 116' of the reservoir 30.

A temperature sensor (not shown) can be mounted inside the pump housing 106 immediately adjacent the bottom wall 114 of the reservoir 104 for sensing the temperature of the bottom wall and thus the temperature of the lubricant in the reservoir.

Figure 3:
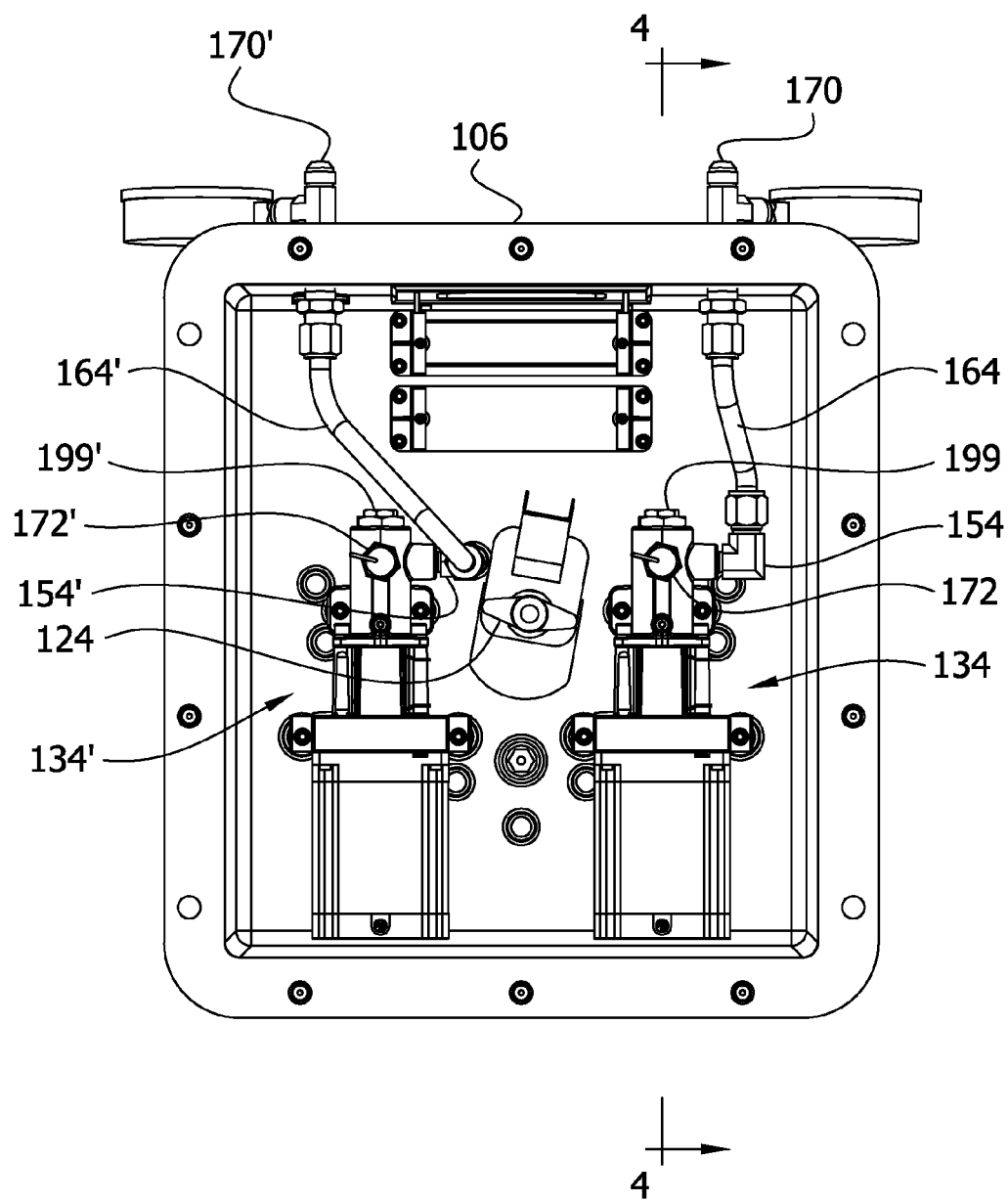
FIG. 3 is a bottom plan of the pump unit of FIG. 2.

Referring to FIG. 3, a first pump, generally designated 134, and a second pump, generally designated 134', are mounted in the pump housing 106 immediately adjacent the bottom wall 114 of the reservoir 104. An outlet fitting 154 is connected to an outlet port 156 of the first pump 134 for delivering fluid to a first feed line 164 attached to the pump housing 106 at a first location. A downstream end of the feed line 164 is equipped with a connector 170 to facilitate connection of the feed line to a lube supply line supplying lubricant to a distribution system of one kind or another. In the illustrated embodiment, the connector 170 is a flare fitting. Other connectors are within the scope of the present invention, such as a quick connect/disconnect connector. A pressure sensor 172 is attached in fluid communication with a pressure sensor port 174 of the outlet fitting 154 to sense pressure at the outlet of the first pump 134.

Similarly, an outlet fitting 154' is connected to an outlet port 156' of the second pump 134' for delivering fluid to a second feed line 164' attached to the pump housing 106 at a second location. A downstream end of the feed line 164' is equipped with a connector 170' to facilitate connection of the feed line to a lube supply line supplying lubricant to a distribution system of one kind or another. In the illustrated embodiment, the connector 170' is a flare fitting. Other connectors are within the scope of the present invention, such as a quick connect/disconnect connector. A pressure sensor 172' is attached in fluid communication with a pressure sensor port 174' of the outlet fitting 154' to sense pressure at the outlet of the first pump 134'.

Figure 4:
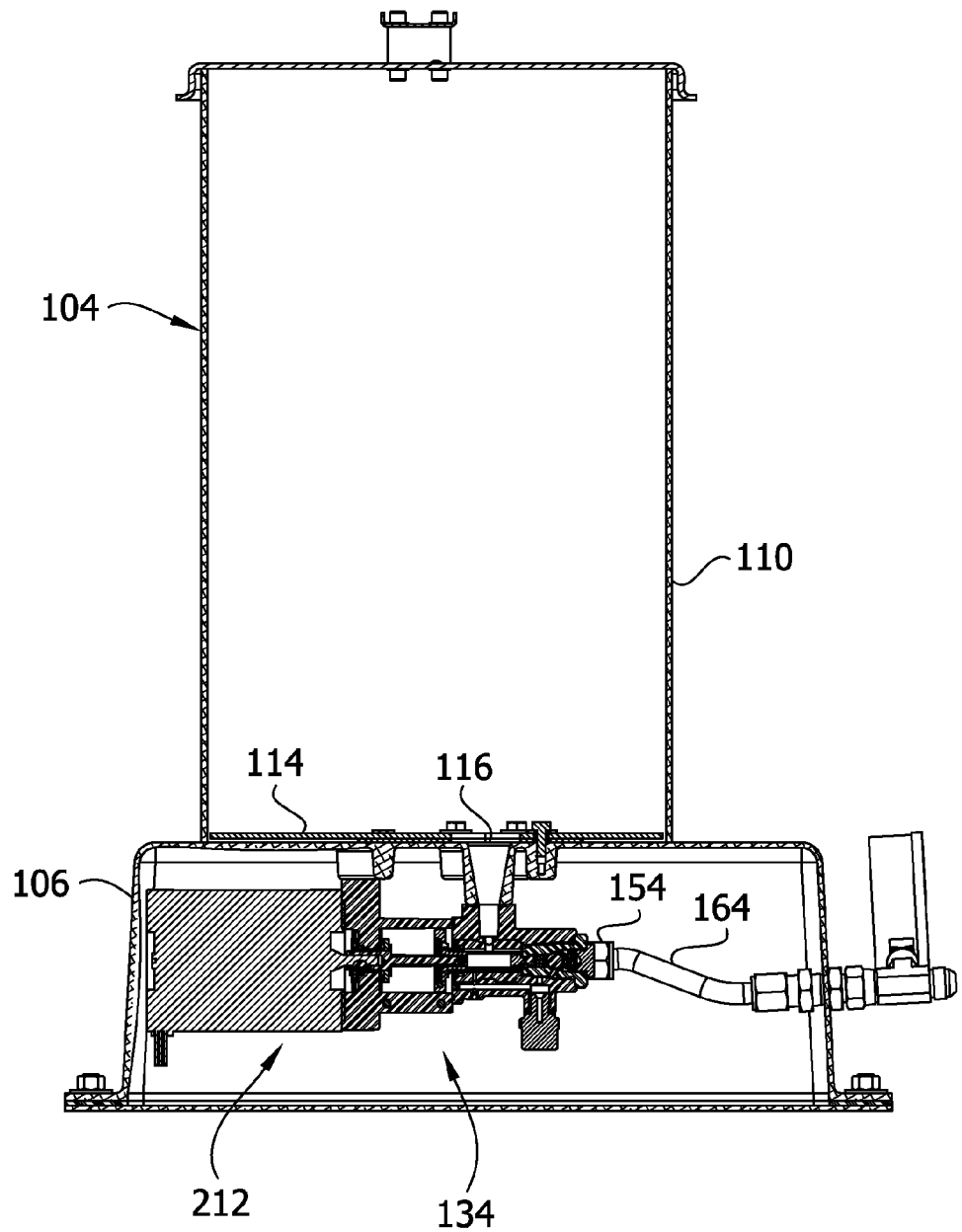
FIG. 4 is a vertical section of the pump unit taken in the plane of line 4-4 of FIG. 3.
Figure 5:
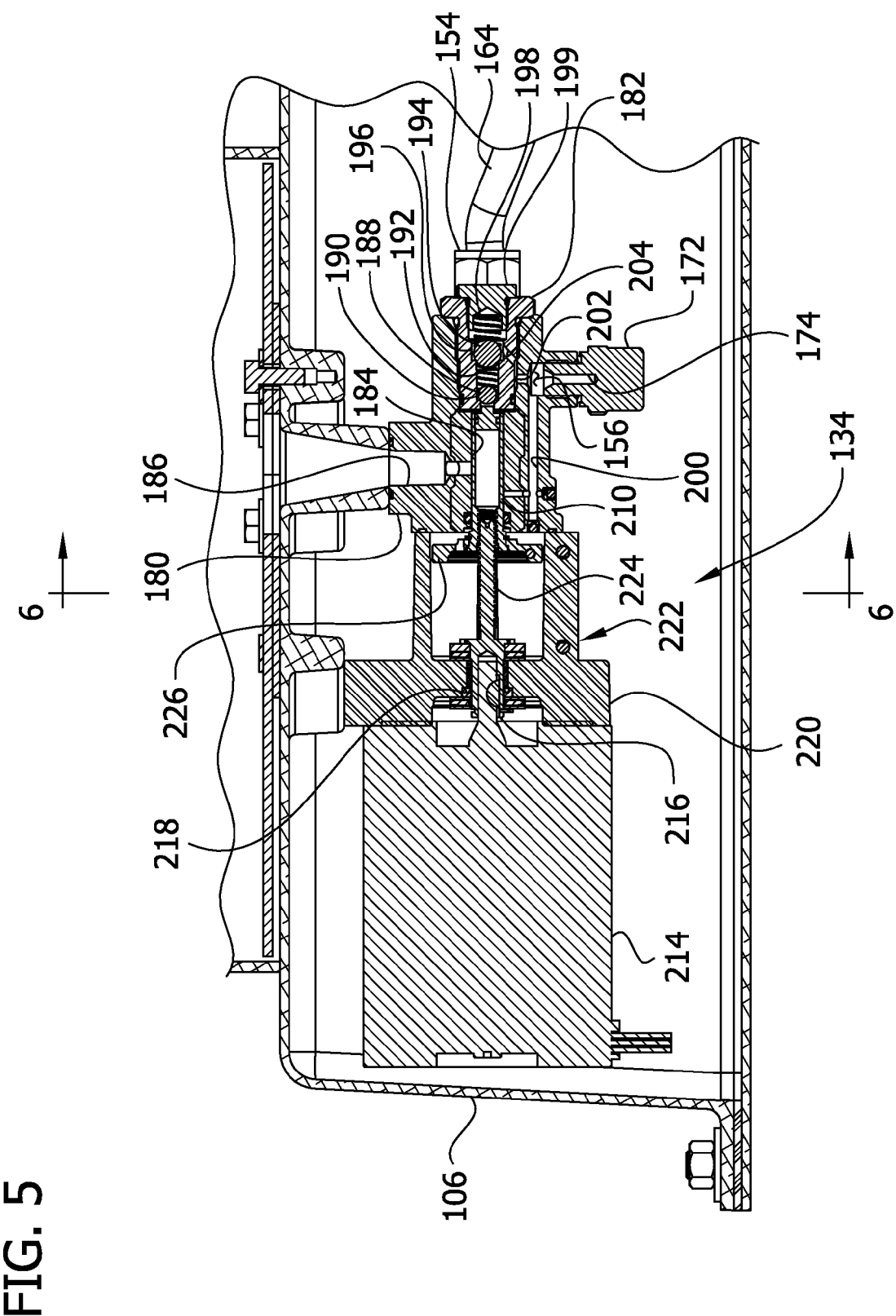
FIG. 5 is an enlarged detail of FIG. 4 illustrating a linear drive mechanism of the pump unit.

As shown in FIGS. 4 and 5, the first pump 134 is of two-part construction, comprising an inlet cylinder part 180 and an outlet cylinder part 182 in threaded engagement. The two parts have longitudinal bores that combine to define a central longitudinal cylinder bore 184 of the pump 134. The inlet part 180 has a radial bore 186 defining a cylinder inlet that communicates with the first reservoir outlet 116, allowing flow of lubricant from the reservoir 104 directly (i.e., along a defined flow path) into the longitudinal cylinder bore 184. A first ball check valve 188 is mounted in the outlet cylinder part 182 for movement between a closed position in which it engages a first valve seat 190 on the outlet cylinder part to block flow through the longitudinal cylinder bore 184 and an open position in which it allows flow through the bore. A first coil compression spring 192 reacting at one end against the first ball valve 188 urges the ball valve toward its closed position. The opposite end of the first spring 192 reacts against a second ball check valve 194 downstream from the first ball valve 188. The second ball valve 194 is mounted in the outlet cylinder part 182 for movement between a closed position in which it engages a second valve seat 196 on the outlet cylinder part to block flow through the longitudinal cylinder bore 184 and an open position in which it allows flow through the bore. A second coil compression spring 198 reacting at one end of the second ball valve 194 urges the ball valve toward its closed position. The opposite end of the second spring 198 reacts against a plug 199 threaded into the downstream end of the bore 184. The use of two check valves 188, 194 reduces the risk of backflow of lubricant into the inlet cylinder part 180 during a return stroke of the piston, as described below. Nevertheless, a single check valve arrangement can also be used within the scope of the present invention.

As further illustrated in FIG. 5, a vent passage 200 in the first pump 134 provides fluid communication between a first location in the longitudinal cylinder bore 184 upstream from the first check valve seat 190 and a second location in the longitudinal cylinder bore downstream from the second check valve seat 196. The downstream end of the vent passage 200 communicates with the second location via the outlet port 156, an annular gap 202 located between the inlet cylinder part 180 and the outlet cylinder part 182, and a connecting passage 204 in the outlet cylinder part. The purpose of this vent passage 200 will become apparent hereinafter.

The pump 134 further comprises a piston 210 reciprocatably received in the cylinder bore 184. A pump drive mechanism, generally designated 212, is provided to move the piston 210 longitudinally in the bore 184. In the illustrated embodiment, the drive mechanism 212 is a linear position drive mechanism comprising a stepper motor 214 having an output shaft 216 rotatable in a bushing 218 in an end wall 220 of a follower housing 222 secured to the bottom wall 114 of the reservoir 104. The shaft 216 is in driving engagement with a lead screw 224, and the lead screw is in threaded engagement with a follower 226 in the follower housing 222. The follower 226 and piston 210 are attached in a non-rotatable manner. In the illustrated embodiment, the follower 226 and piston 210 are formed as separate pieces non-rotatably affixed to one another, but they may be integrally formed as one piece.

Figure 6:
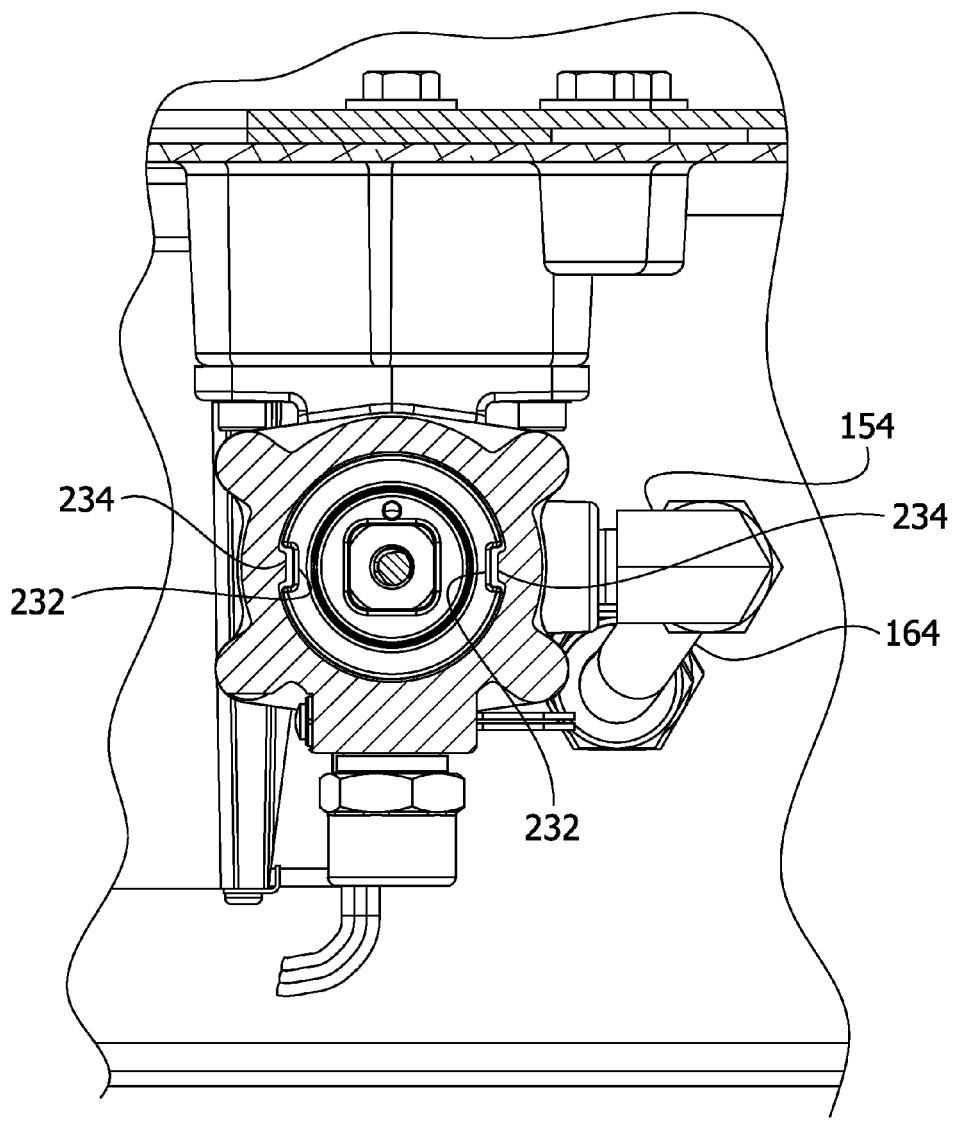
FIG. 6 is a vertical section of the linear drive mechanism taken in the plane 6-6 of FIG. 5.

As illustrated in FIG. 6, the follower 226 has a radial collar 230 with notches 232 for receiving stationary linear guides 234 on the inside of the follower housing 222. The guides 234 extend in a direction generally parallel to the longitudinal cylinder bore 184 and hold the follower 226 (and piston 210) against rotation as the lead screw 224 is rotated by the stepper motor 214. As a result, rotation of the motor output shaft 216 in one direction causes the piston 210 to move in the cylinder bore 184 through a pumping (power) stroke and rotation of the shaft in the opposite direction causes the piston to move in the cylinder bore through a return stroke. The lengths of the strokes are controlled by operation of the stepper motor 214.

Figure 7:
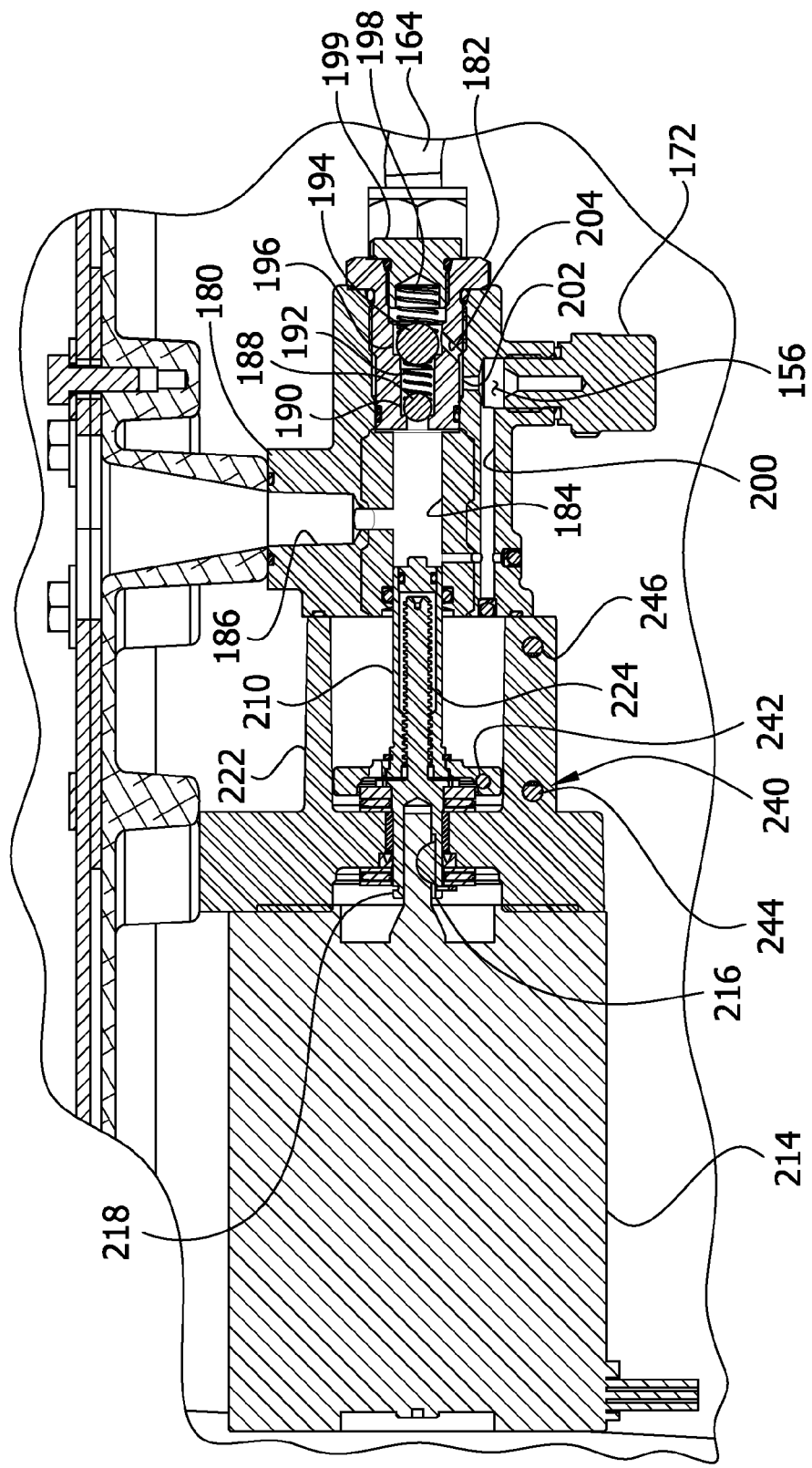
FIG. 7 is an enlarged section of the linear drive mechanism showing a piston at a limit of venting return stroke.
Figure 8:
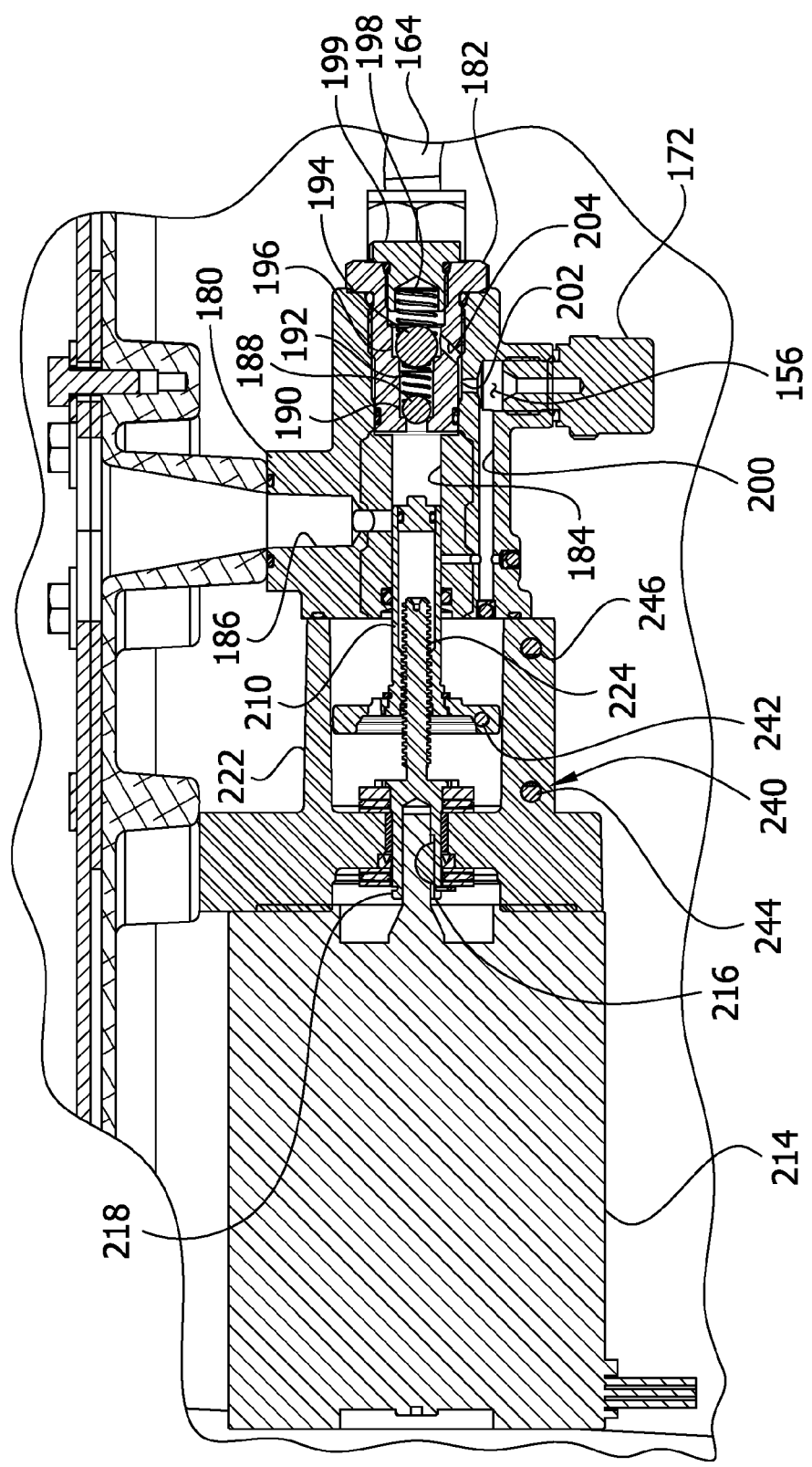
FIG. 8 is an enlarged section of the linear drive mechanism showing a piston at a limit of a non-venting return stroke.

The piston 210 can have a "non-venting" return stroke, in which venting does not occur, and a "venting" return stroke, in which venting occurs. In a non-venting return stroke, the downstream end of the piston 210 remains downstream from the location at which the vent passage 200 communicates with the cylinder bore 184 (see FIG. 8 showing the piston at the limit of its return stroke). As a result, there is no venting of the lube supply line to the reservoir 104 of the pump unit during return strokes of the piston 210. In a venting return stroke, the piston 210 moves to a vent position upstream from the location at which the vent passage 200 communicates with the cylinder bore 184 (see FIG. 7 showing the piston at the limit of its return stroke). As a result, lubricant is vented to the reservoir 104 during the return strokes of the piston 210.

A calibration device, generally designated 240 in FIGS. 7 and 8 is provided for calibrating operation of the stepper motor 214 relative to the position of the piston 210 in the cylinder bore 184. In the illustrated embodiment, this device 240 comprises a magnet 242 on the follower 226 movable with the piston 210 and follower, and at least one and desirably two magnetic field sensors 244, 246 mounted on the follower housing 222 at spaced-apart locations with respect to the direction of piston movement. By way of example only, the sensors 244, 246 may be reed switches in proximity to the magnet 242.

Although the second pump 134' may be different from the first pump 134, in the illustrated embodiment the first and second pumps are identical. Because the pumps 134, 134' are identical, the second pump 134' will not be described in detail. For convenience, components of the second pump 134' will be numbered identically to those of the first 134 but followed with a prime symbol (').

In some embodiments, one motor may be used to drive one of the pumps and drive the stirrer. In other embodiments such as the illustrated embodiment, the stirrer drive mechanism 124 and each of the stepper motors 214, 214' are separate, distinct, independently energized motors. One advantage of using separate motors is evident in colder environments where the lubricant may become stiff resulting in an increased resistance to rotation of the stirrer. This increased resistance slows down rotation of the motor driving the stirrer. If the motor driving the stirrer is also driving one of the pumps, the slower rotation reduces the speed of that pump. In contrast, when independently energized motors are used, if the lubricant is stiff and slows down the stirrer motor, both pump motors can continue to operate independently to pump lubricant at speeds independent from the speed of the stirrer motor.

Figure 9:
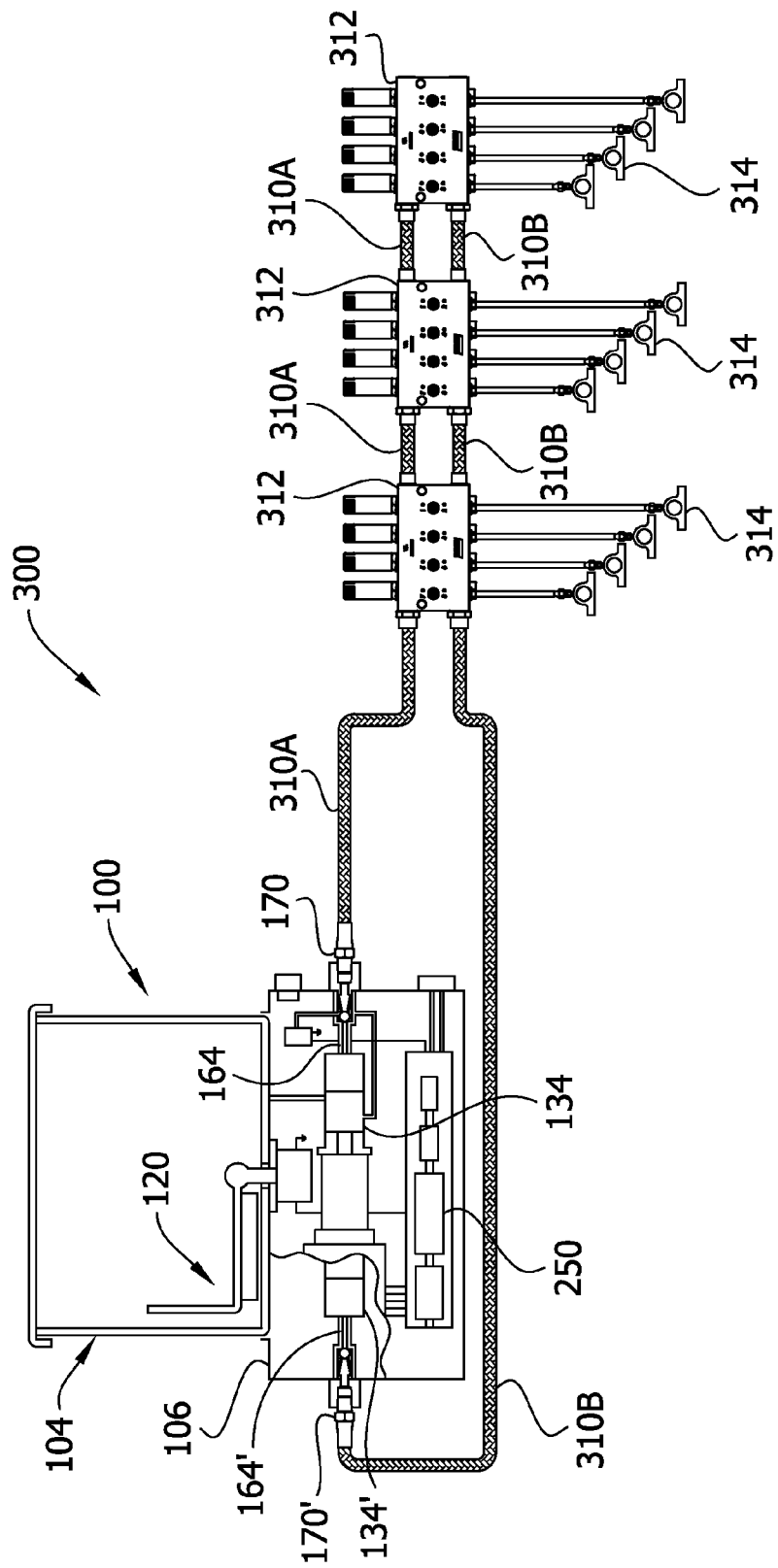
FIG. 9 is a diagrammatic view of a lubrication system of the present invention including dual-line metering valves.

Referring to FIG. 9, the pump unit 100 includes a controller 250 for calibrating and controlling operation of the linear position drive mechanisms 212, 212'. The controller 250 receives signals from the pressure sensors 172, 172' and the calibration devices 240, 240' (e.g., magnetic field sensors 244, 246, 244', 246'). The controller 250 includes a programmable microprocessor that processes information and controls operation of the stirrer mechanism 124 and the stepper motors 214, 214'.

An operator input having a display (not shown) is provided for inputting information to the controller 250 and for displaying information from the controller. This information may include a type of lubrication distribution system to be used with the pumping unit, a volume of lubricant to be delivered to each point of lubrication (e.g., bearing), and a frequency of lubrication events. Information can also be uploaded and downloaded to and from the controller via a USB port on the pump housing 106 of the pump unit 100.

In the dual-line system 300 of FIG. 9, a reversing valve is not required because two pumps 134, 134' are used in the pump unit 100. A first main lubrication line 310A is in fluid communication with the first feed line 164. Lubricant is pumped from the reservoir 104 to the first main lubrication line 310A by the first pump 134. A second main lubrication line 310B is in fluid communication with the second feed line 164'. Lubricant is pumped from the reservoir 104 to the second main lubrication line 310B by the second pump 134'. (Note that FIG. 9 is a diagrammatic view in which, for purposes of illustration, the orientation of the pumps 134, 134' differs from the orientation in FIG. 3.) The main lubrication lines 310A, 310B deliver lubricant to dual-line metering valves 312 that deliver metered amounts of lubricant to points of lubrication 314 (e.g., bearings). The dual-line metering valves 312 are substantially identical to the dual-line metering valves 54 of the conventional dual-line system.

Figure 10:
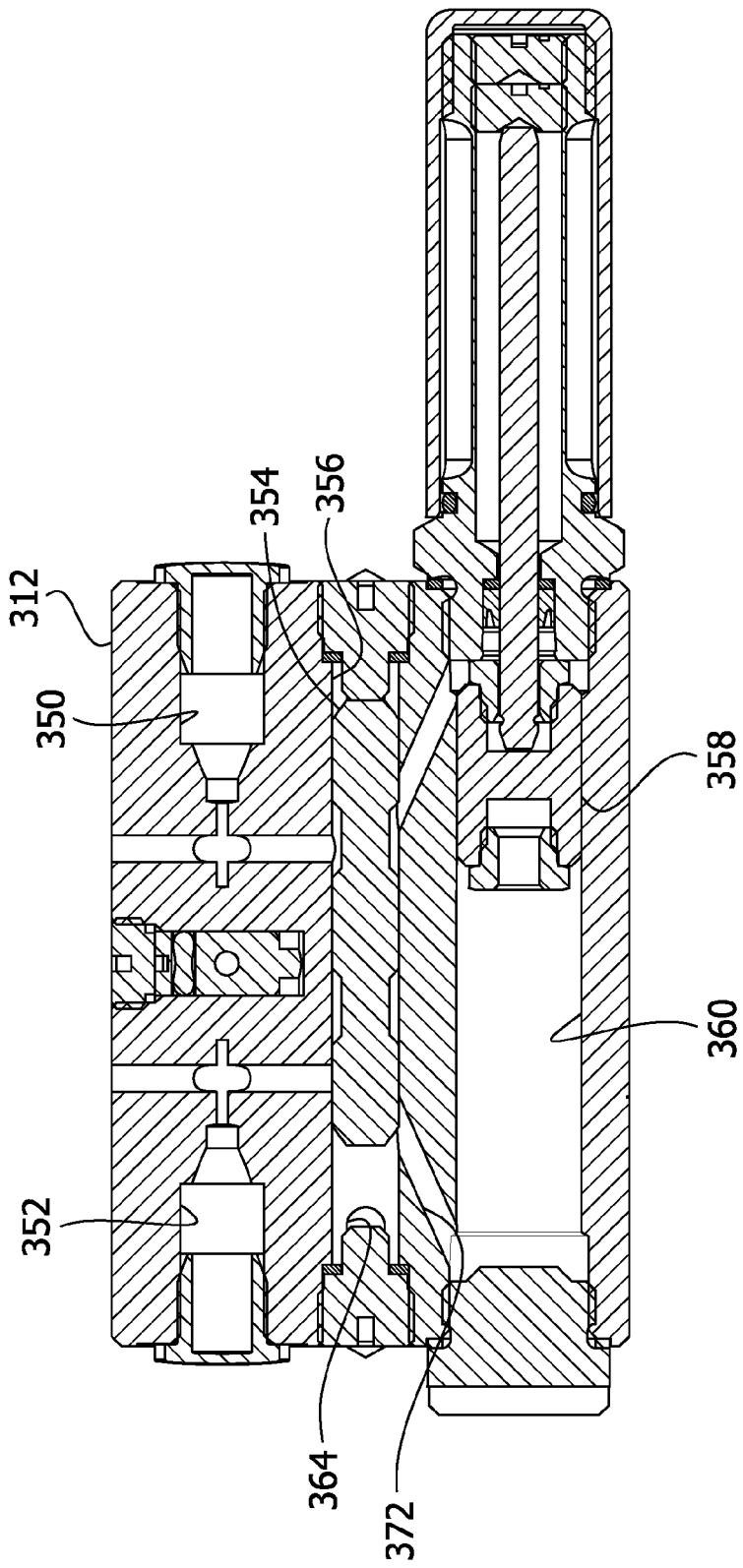
FIG. 10 is a schematic of a conventional dual-line metering valve for use with the lubrication system of the present invention, showing a pilot piston and a metering piston in a first position.
Figure 11:
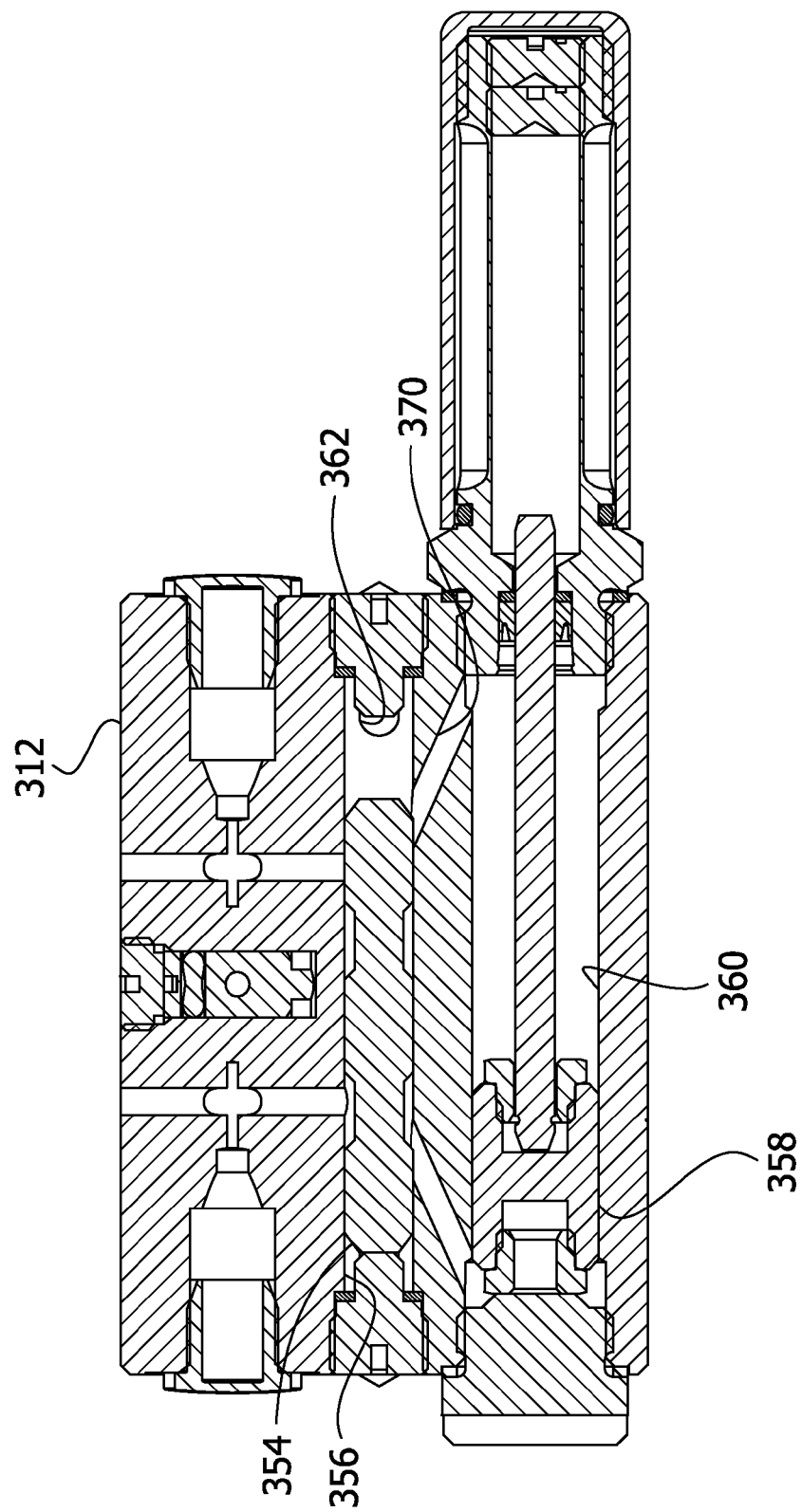
FIG. 11 is a schematic of the dual-line metering valve of FIG. 10, showing the pilot piston and the metering piston in a second position.

Each dual-line metering valve 312 is a positive displacement metering device with an adjustable stroke piston to dispense measured volumes of oil or grease. FIGS. 10 and 11 illustrate a schematic of a metering valve 312 having a first outlet port 350 and a second outlet port 352. The dual-line metering valve 312 dispenses an equal volume of lubricant through each of the two outlet ports 350, 352. The dual-line metering valve 312 comprises a pilot piston 354 in a pilot piston passage 356 to direct the inlet lubricant flow, and an output metering piston 358 in a metering piston passage 360. A first inlet port 362 and a second inlet port 364 are in fluid communication with a supply of lubricant and with the pilot piston passage 356. When the pilot piston 354 is at a first location to the left of the pilot piston passage 356 (as illustrated in FIG. 11), the first inlet port 362 communicates with a first pilot connecting passage 370. When the pilot piston 354 is at a second location to the right of the pilot piston passage 356 (as illustrated in FIG. 10), the second inlet port 364 communicates with a second pilot connecting passage 372.

Operation of the metering valve 312 will now be described with reference to FIGS. 10 and 11. Pressurized lubricant enters the dual-line metering valve through the first inlet port 362, forcing the pilot piston 354 to the first location at the left of the pilot piston passage 356. A small amount of displaced lubricant is relieved or vented through the second inlet port 364. Movement of the pilot piston 354 to the left of the pilot piston passage 356 permits lubricant flow through the first pilot connecting passage 370 and into the metering piston passage 360. The lubricant forces the metering piston 356 to move full stroke to the left in the metering piston passage 360, thereby forcing lubricant that was in the metering piston passage through the second pilot connecting passage 372 to be dispensed through the second outlet port 352. This completes the first half of the lubrication cycle.

The supply of lubricant to the first inlet port 362 is stopped, and pressurized lubricant enters the dual-line metering valve 312 through the second inlet port 364, forcing the pilot piston 354 to the second location at the right of the pilot piston passage 356. A small amount of displaced lubricant is relieved or vented through the first inlet port 362. Movement of the pilot piston 354 to the right of the pilot piston passage 356 permits lubricant flow through the second pilot connecting passage 372 and into the metering piston passage 360. The lubricant forces the metering piston 356 to move full stroke to the right in the metering piston passage 360, thereby forcing lubricant that was in the metering piston passage through the first pilot connecting passage 370 to be dispensed through the first outlet port 350. This completes the second half of the lubrication cycle. Though the dual-line metering valve 312 is described as having two outlets, the metering valve can have more outlets to deliver lubricant to a greater number of lubrication points 314 within the scope of the present invention. Dual-line metering valves such as the VSG, VSL, VSKH, and VSKV models sold by Lincoln Industrial are suitable for use with the present invention.

Desirably, the controller 250 initiates operation of the stirrer mechanism 124 before either of the stepper motors 214, 214' is operated to reciprocate the respective pistons 210, 210'. This sequence allows the stirrer 120 to fluidize the lubricant and prime the pumps 134, 134' with lubricant before the actual pumping of lubricant begins, which can be especially advantageous if the lubricant is in a viscous condition, as in cold-temperature environments. After a suitable delay of predetermined length (e.g., eight-twelve seconds), one or both of the stepper motors 214, 214' is energized to move the respective pistons 210, 210' through a succession of pumping (power) strokes and return strokes to pump the desired amount of lubricant through the feed lines 164, 164'.

In a first stage of operation, the controller operates the first pump 134 to pump lubricant from the reservoir 104 through the first main lubrication line 310A to be dispensed under pressure from a first side of each metering valve 312 to the respective points of lubrication 314. In this first stage of operation, the second pump 134' is idle and the piston 210' is in a venting position. Lubricant is vented back to the reservoir 104 by the metering valve 312 through the second main lubrication line 310B and the second pump 134'. During a second stage of operation, the second pump 134' pumps lubricant from the reservoir 104 through the second main lubrication line 310B to be dispensed under pressure from a second side of each metering valve 312 to the respective points of lubrication 314. In this second stage of operation, the first pump 134 is idle and the piston 210 is in a venting position. Lubricant is vented back to the reservoir 104 by the metering valve 312 through the first main lubrication line 310A and the first pump 134.

Using two pumps in a dual-line lubrication system provides several benefits over the conventional dual-line system having one pump and a reversing valve. Each pump is only used for one stage of operation, and remains idle during the other stage of operation. Thus, there is less wear on each pump and less potential for overheating. Furthermore, the use of two pumps takes advantage of economies of scale, and can thus be a less expensive alternative to using a reversing valve. The cost of the reversing valve is eliminated. Using multiple pumps and feed lines provides greater flexibility when installing the system in the field.

The dual-line system as illustrated can be implemented as a dual-line zone and combined with other dual-line zones, combined with divider valve zones, or used alone (as shown in FIG. 9) without departing from the scope of the present invention. As will be appreciated by those skilled in the art, dual-line zones can be used effectively with long lines, at high pressures, and/or for hundreds of lubrication points. In addition to the dead-end system illustrated, the dual-line zone can be configured to have other dual-line system layouts, such as an end-of-the-line system or a loop system, depending on its particular application.

The pump unit 100 of this invention can also be used with different distribution systems. By way of example but not limitation, the pump unit may be used with a dual-line system 300 as described above, a progressive (divider) valve distribution system, an injector distribution system, a CAN bus distribution system, a zoned distribution system, and combinations of these systems. Although in the dual-line system described above only one of the pumps 134, 134' operates at any given time, in other distribution systems both pumps may operate at the same time.

The pressure sensors 172, 172' at the outlet end of each cylinder bore 184, 184' are provided to prevent motor stalling and system over-pressuring. The controller 250 is responsive to signals from these sensors 172, 172'. If the pressure sensed by either of the sensors 172, 172' remains below a maximum system pressure (e.g., 5000 psi), the controller maintains the speeds of the respective stepper motor 214, 214 to pump lubricant at a predetermined rate. If the pressure sensed by either of the sensors 172, 172' increases above the limit, the controller 250 operates the respective stepper motor 214, 214' at a slower speed to deliver lubricant at a slower rate to avoid motor stalling and to avoid system over-pressuring.

The controller 250 can be programmed to pump a preset volume of lubricant in a period of time or to pump for a number of pumping strokes. Thus, the controller can control the stepper motor of each pump to pump a preset volume based on a period of time of pump stepper motor operation (e.g., preset volume equals minutes of pump stepper motor 194, 194' operation times in$^3$/min or preset volume equals minutes of pump stepper motor operation times cc/min) in order to dispense the preset volume of lubricant. Alternatively, the controller 250 can control each pump stepper motor 194, 194' to pump a preset volume based on a number of pumping strokes (e.g., volume equals number of piston strokes times the volume of the cylinder bore displaced by the piston movement during each pumping stroke) in order to dispense the preset volume of lubricant. This type of preset volume control is particularly applicable in lube-on-demand type systems and in divider valve distribution systems. In one embodiment, a user can enter via the input device 254 a preset volume of lubricant to be pumped either in a manual mode which is initiated by the user or in an automatic mode which is executed periodically by the processor for each lube event. In response, the controller energizes the respective pump motor 214, 214' for a period of time corresponding to the preset volume. Although this type of preset volume control does not require sensors such as pressure or volume sensors, it is contemplated that sensors may be used optionally in certain embodiments to confirm the preset volume of lubricant has been pumped.

Although use of a stepper motor is described, other types of reversible motors, such as a servo motor, are within the scope of the present invention. For example, any of the drive mechanisms and motors described in U.S. patent application Ser. No. 13/271,814 may be used in the present invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The Abstract and Summary are provided to help the reader quickly ascertain the nature of the technical disclosure. They are submitted with the understanding that they will not be used to interpret or limit the scope or meaning of the claims.

The above description illustrates the invention by way of example and not by way of limitation. When two items or multiple items are illustrated, it is contemplated that the invention may include two or more items. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The invention claimed is:

1. A dual-line lubrication system comprising:
   a reservoir having an interior for holding lubricant;
   a first pump in communication with the interior of the reservoir for pumping lubricant from the reservoir through a first main line;
   a second pump in communication with the interior of the reservoir for pumping lubricant from the reservoir through a second main line; and
   a dual-line metering valve having a first valve inlet in communication with the first main line and the first pump and a second valve inlet in communication with the second main line and the second pump,
   wherein during a first stage of operation the first pump operates to pump lubricant from the reservoir through the first main line to the first valve inlet of the dual-line metering valve and the second pump is idle, the dual-line metering valve venting back to the reservoir via the second main line and the second pump, and
   wherein during a second stage of operation the second pump operates to pump lubricant from the reservoir through the second main line to the second valve inlet of the dual-line metering valve and the first pump is idle, the dual-line metering valve venting back to the reservoir via the first main line and the first pump.

2. The dual-line lubrication system of claim 1, wherein the reservoir further comprises a first outlet and a second outlet, the first pump being in communication with the first outlet and the second pump being in communication with the second outlet.

3. The dual-line lubrication system of claim 1, wherein each pump comprises a linear position drive mechanism, the linear position drive mechanism comprising a reversible motor.

4. The dual-line lubrication system of claim 3, wherein the reversible motor is a stepper motor.

5. A dual-line pump unit for supplying lubricant, comprising:
   a reservoir having an interior for holding lubricant,
   a first pump for pumping lubricant from the reservoir through a first main line to a lubricant distribution system; and
   a second pump for pumping lubricant from the reservoir through a second main line to the lubricant distribution system, each of said pumps comprising:
   a cylinder bore;

a cylinder inlet in communication with the interior of the reservoir for flow of lubricant from the reservoir into the cylinder bore;

a cylinder outlet;

a piston movable in the cylinder bore;

a vent passage communicating with the interior of the reservoir;

a linear position drive mechanism for moving the piston (i) in a forward direction in the cylinder bore through a pumping stroke for pumping lubricant through the cylinder outlet to a respective main line for supply of lubricant to the lubricant distribution system, (ii) in a rearward direction through a non-venting return stroke in which the vent passage does not communicate with the interior of the reservoir, and (iii) in a rearward direction through a venting return stroke in which the vent passage communicates with the interior of the reservoir; and a controller for controlling operation of the linear position drive mechanism, the controller operating the drive mechanism in a first stage of operation to move the piston of the first pump through at least one pumping stroke to pump lubricant through the first main line to the lubrication distribution system while the second main line vents back to the reservoir via the vent passage of the second pump, and the controller operating the drive mechanism in a second stage of operation to move the piston of the second pump through at least one pumping stroke to pump lubricant through the second main line to the lubrication distribution system while the first main line vents back to the reservoir via the vent passage of the first pump.

6. The dual-line pump unit of claim 5, wherein the vent passage of a respective pump also communicates with the cylinder bore of the respective pump.

7. The dual-line pump unit of claim 5, wherein the lubricant distribution system comprises at least one dual-line metering valve.

8. The dual-line pump unit of claim 7, wherein during the first stage of operation the at least one dual-line metering valve vents back to the reservoir via the vent passage of the second pump, and during the second stage of operation the at least one dual-line metering valve vents back to the reservoir via the vent passage of the first pump.

9. The dual-line pump unit of claim 5, wherein the linear position drive mechanism comprises a reversible motor.

10. The dual-line pump unit of claim 5, wherein the linear position drive mechanism comprises a stepper motor.

11. The dual-line pump unit of claim 5, further comprising a pressure sensor for sensing the pressure at the outlet of the cylinder bore, the controller being responsive to signals from the pressure sensor to vary the speed of the linear position motor.

12. The dual-line pump unit of claim 5 wherein the controller is configured to pump a preset volume of lubricant and wherein the controller operates the linear drive mechanism for a preset period of time or for a preset number of pumping strokes to pump the preset volume of lubricant.

13. A method of supplying lubricant to a dual-line lubrication system, comprising:

operating in a first stage of operation a first pump through a pumping stroke to pump lubricant from a reservoir through a first main line to a dual-line metering valve while venting the dual-line metering valve to the reservoir through a second pump; and operating in a second stage of operation the second pump through a pumping stroke to pump lubricant from the reservoir through a second main line to the dual-line metering valve while venting the dual-line metering valve to the reservoir through the first pump.

14. The method of supplying lubricant to a dual-line lubrication system of claim 13, wherein the first stage of operation further comprises venting the dual-line metering valve to the reservoir via a main line and a vent passage of the second pump.

15. The method of supplying lubricant to a dual-line lubrication system of claim 14, wherein the first stage of operation further comprises venting the dual-line metering valve to the reservoir via a cylinder bore of the second pump.

16. The method of supplying lubricant to a dual-line lubrication system of claim 15, wherein the step of operating in a second stage of operation further comprises venting the dual-line metering valve to the reservoir via a cylinder bore of the first pump.

17. The method of supplying lubricant to a dual-line lubrication system of claim 14, wherein the step of operating in a second stage of operation further comprises venting the dual-line metering valve to the reservoir via a different main line and a vent passage of the first pump.

* * * * *